(12) United States Patent
Yamaguchi et al.

(10) Patent No.: US 6,993,526 B2
(45) Date of Patent: Jan. 31, 2006

(54) ELECTRONIC CATALOG SYSTEM, CATALOG DATA PRINTING METHOD, SERVER, AND COMPUTER READABLE RECORDING MEDIA RECORDING PROGRAM USED IN SERVER

(75) Inventors: Hiroshi Yamaguchi, Shizuoka-ken (JP); Hirofumi Harada, Chiba-ken (JP); Hiroshi Shintani, Tokyo (JP); Aya Inokuchi, Kanagawa-ken (JP); Akinori Iwase, Kanagawa-ken (JP); Kazuhiro Ogura, Kanagawa-ken (JP); Miho Inahara, Tokyo (JP)

(73) Assignee: Toshiba Tec Kabushika Kaisha, Tokyo (JP)

( * ) Notice: Subject to any disclaimer, the term of this patent is extended or adjusted under 35 U.S.C. 154(b) by 539 days.

(21) Appl. No.: 10/128,524

(22) Filed: Apr. 24, 2002

(65) Prior Publication Data

US 2002/0193097 A1 Dec. 19, 2002

(30) Foreign Application Priority Data

Apr. 26, 2001 (JP) .................................. P2001-130032

(51) Int. Cl.
*G06F 17/30* (2006.01)

(52) U.S. Cl. ........................ 707/10; 707/104.1; 709/203
(58) Field of Classification Search ................. 707/2–4, 707/10, 104.1, 100; 709/203, 217, 218, 238; 455/3.01, 3, 426.2, 429, 432.1, 437–439, 455/456.6, 423

See application file for complete search history.

(56) References Cited

U.S. PATENT DOCUMENTS

| | | | | |
|---|---|---|---|---|
| 6,421,781 B1 | * | 7/2002 | Fox et al. | 713/201 |
| 6,513,112 B1 | * | 1/2003 | Craig et al. | 713/1 |
| 6,654,786 B1 | * | 11/2003 | Fox et al. | 709/203 |
| 6,766,165 B2 | * | 7/2004 | Sharma et al. | 455/423 |

* cited by examiner

*Primary Examiner*—Greta Robinson
*Assistant Examiner*—Cheryl Lewis
(74) *Attorney, Agent, or Firm*—Foley & Lardner LLP

(57) ABSTRACT

An electronic catalog system sends catalog address information to a mobile phone through a wireless communication, sends catalog data adaptable to address information selected by the mobile phone to a storage server, and prints and outputs catalog data stored in the storage server.

11 Claims, 8 Drawing Sheets

ELECTRONIC CATALOG SYSTEM, CATALOG DATA PRINTING METHOD, SERVER, AND COMPUTER READABLE RECORDING MEDIA RECORDING PROGRAM USED IN SERVER

BACKGROUND OF THE INVENTION

1. Field of the Invention

This invention relates to an electronic catalog system, a catalog printing method, a server, and a computer readable recording media recording a program that is used in the server.

2. Description of the Related Art

When new products are developed by manufactures, exhibitions are held to display these new products.

At the exhibitions, catalogs are distributed at the same time to display new products.

In the case of a large scaled exhibition, the number of new products is increased and the number of catalogs also becomes voluminous accordingly.

As a result, if a person visited the exhibition and collected catalogs of interested products, the number of catalogs becomes considerably voluminous and heavy to bring them back to his company.

SUMMARY OF THE INVENTION

It is an object of this invention to provide an electronic catalog system, a catalog data printing method, a server and a computer readable recording media recording a program that is used in this server. This system is capable of printing and outputting substances of catalogs at a place other than an exhibit hall.

According to this invention, an electronic catalog system is provided. This electronic catalog system comprises a catalog server; a storage server to communicate with the catalog server and a mobile terminal through a network; and a terminal device to communicate with the storage server through the network; wherein the catalog server includes: a database to store address information for identifying plural catalog data and each catalog data; wireless communicating means for making the wireless communication within a specified range around the catalog server; and data sending/receiving means for sending the address information of the catalog data to the mobile terminal through the wireless communicating means and sending the catalog data adaptable to the address information selected by the mobile terminal to the storage server; wherein the storage server includes: communication means; and storage means for storing various information including catalog data; wherein the terminal device includes: means for requesting take-out of information to the storage server; and means for printing and outputting received information when the information is received from the storage server.

Further, according to this invention, a catalog printing method is provided. This method comprises: sending address information storing electronic catalog data to a mobile terminal through a wireless communication; sending catalog data adaptable to address information selected by a mobile terminal to a storage server; and printing and outputting catalog data stored in the storage server.

Further, according to this invention, a server is provided. This server comprises storage means for storing electronic catalog data; and sending means for sending catalog data stored in the storage means to a terminal device in response to an information take-out request from the terminal device.

Further, according to this invention, a storage media storing a program that can be read by a computer that is used as a server is provided. This program comprises the steps of: storing catalog data in a storing means; and sending catalog data stored in the storage means to a terminal device in response to an information take-out request made therefrom.

DETAILED DESCRIPTION OF THE INVENTION

Figure 1:
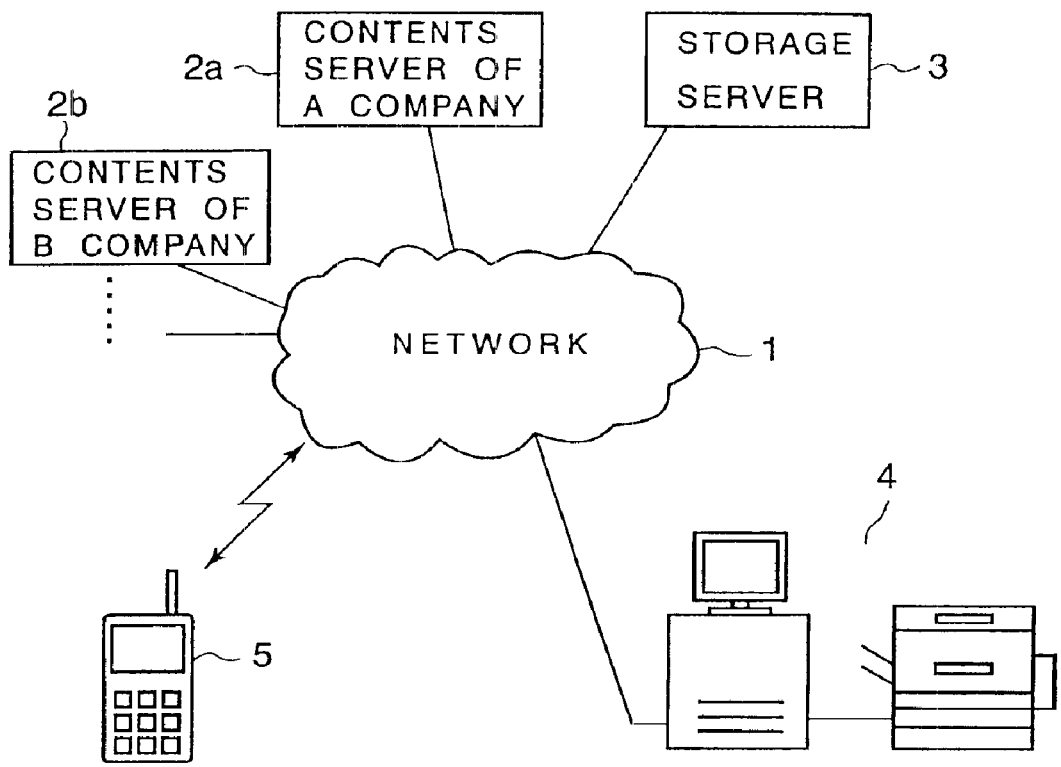
FIG. 1 is a schematic block diagram showing the structure of the electronic catalog system in a first embodiment of this invention.

The first embodiment of this invention will be described below referring to the drawings. Further, this first embodiment will be explained regarding the invention applied to an electronic catalog system.

First Embodiment

FIG. 1 is a block diagram showing the structure of the entire electronic catalog system. A contents server 2a of A company, a contents server 2b of B company . . . , and a storage server 3 are connected to a network 1 that is the internet communication line. Plural terminal devices 4 are connected to the network 1. The terminal device 4 is installed in a company or a convenience store. Reference Numeral 5 shows a mobile phone that is a mobile terminal.

Figure 3:
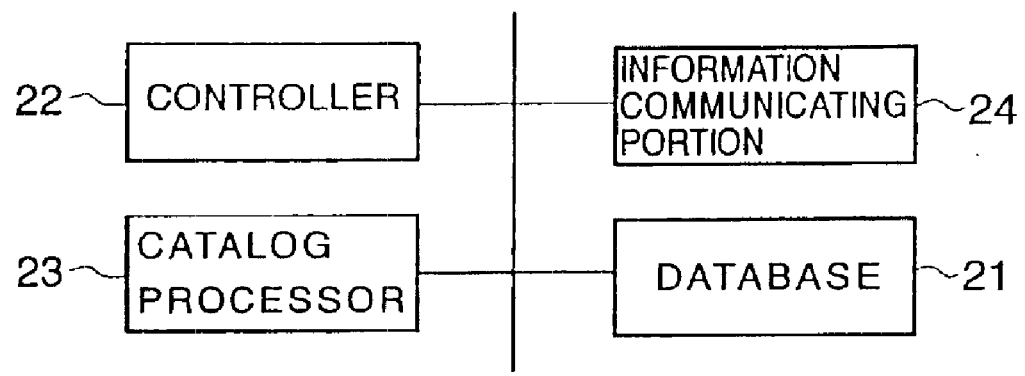
FIG. 3 is a block diagram showing the structure of a contents server of the electronic catalog system shown in FIG. 1.

The contents server 2a of A company, the contents server 2b of B company, . . . are installed at an exhibition hall. These contents servers send address information for identifying catalog data of A Company, B Company, . . . according to a data transferring function (for example, the "BLUETOOTH™" function). The detailed structures of these contents servers 2a, 2b, . . . of A and B Companies will be described later referring to FIG. 3. The contents server 2a of A Company will be described below as a representative server.

The contents server 2a has a database 21, comprising a hard disc drive, etc., a controller 22, a catalog processor 23 for executing the electronic catalog process, and an information communicating portion 24 equipped with a wireless communication means for communicating with the storage server 3 through the network 1 and sending/receiving address information for identifying catalog data and a data sending/receiving means within a range of 10m according to the BLUETOOTH™ function.

Figure 4:
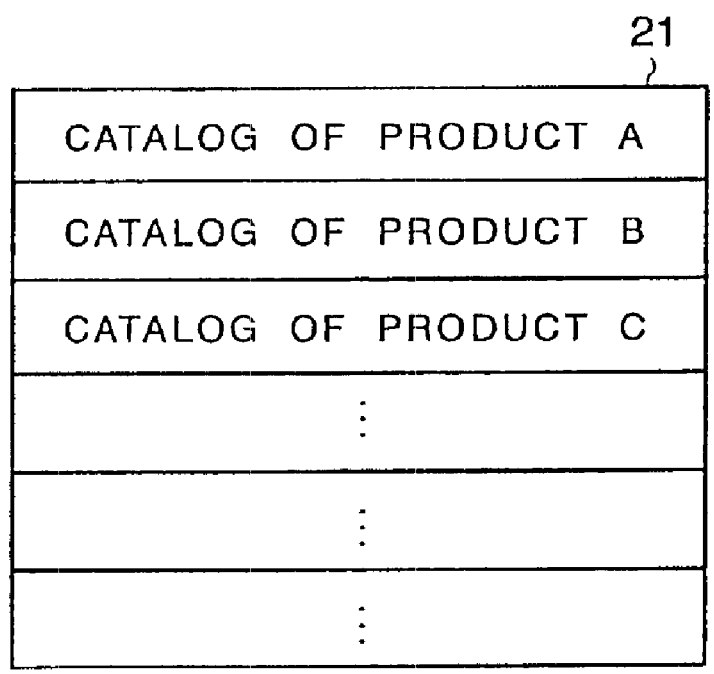
FIG. 4 is a map showing contents stored in a database of the electronic catalog system shown in FIG. 1.

The data base 21 stores catalog data of products a, b, c, etc. of A Company as shown in FIG. 4.

Figure 2:
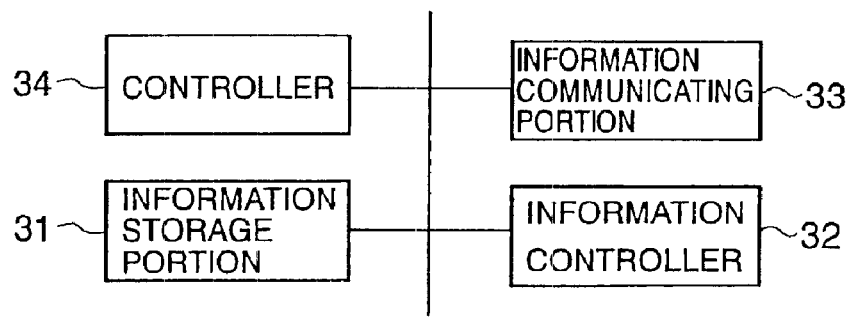
FIG. 2 is a block diagram showing the structure of a storage server of the electronic catalog system shown in FIG. 1.

The storage server 3 comprises a hard disc drive, etc. as shown in FIG. 2 and is equipped with an information storage portion 31 that is a means for storing electronic catalog data sent from the contents servers 2a, 2b, . . . , an information controller 32 for controlling information stored in the information storage portion 31, an information communicating portion 33 for making the information communication with the contents servers 2a, 2b, . . . through the network 1, also for making the communication with a mobile phone 5 and taking out electronic catalog data from the information storage portion 31 and sending the same to the terminal device 4 when so requested, and a controller 34.

Figure 5:
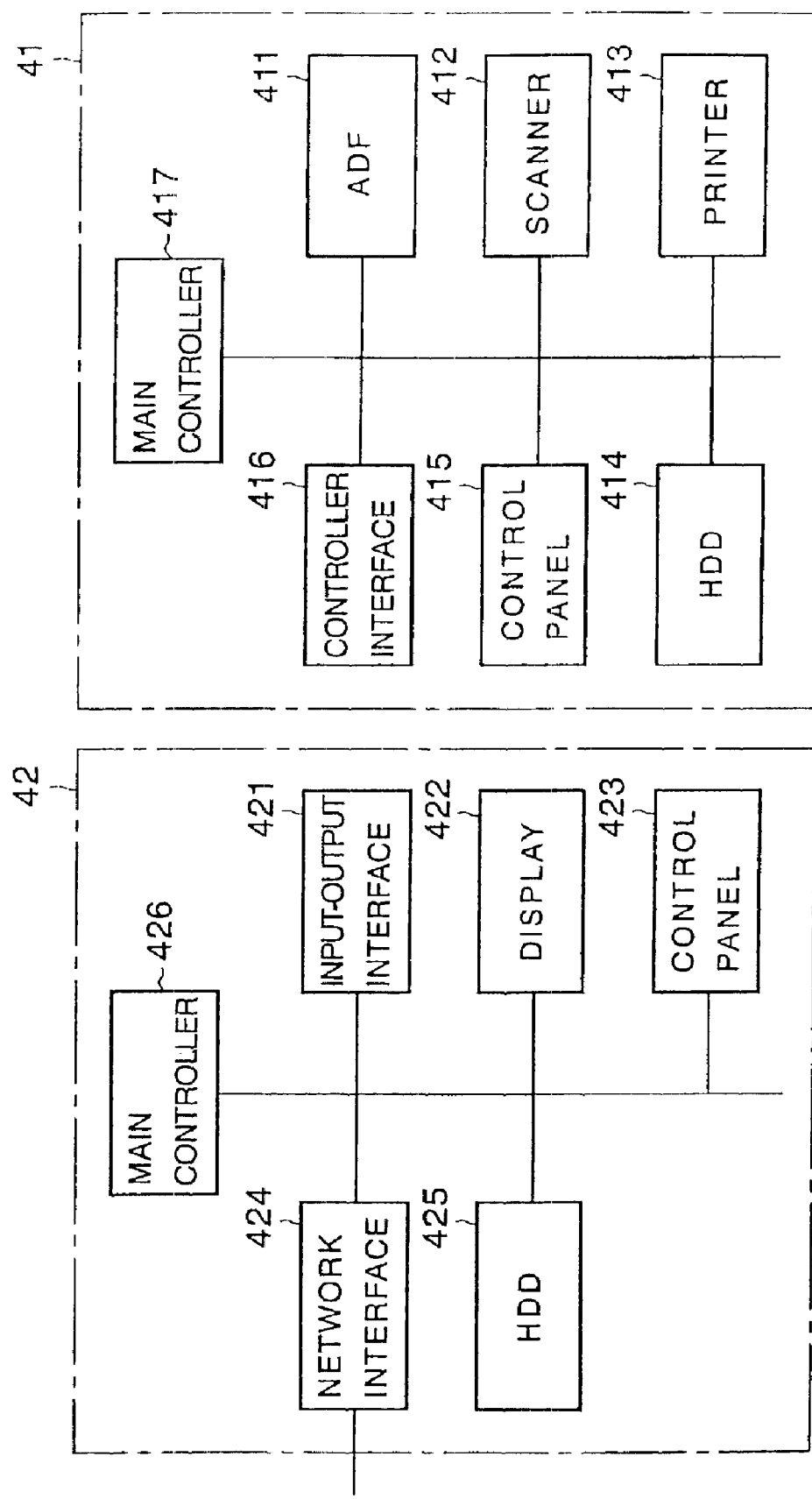
FIG. 5 is a block diagram showing the structure of a terminal device of the electronic catalog system shown in FIG. 1.

The terminal device 4 is composed of an input-output device 41 that is composed of a digital copier, etc. and a controller 42 for controlling this input-output device 41 as shown in FIG. 5. The input-output device 41 is composed of an automatic document feeder (ADF) 411, a scanner 412 for reading documents, a printer 413 that is a printing and outputting means, a hard disc drive (HDD) 414, a control panel 415, a controller interface 416 that is connected to the controller 42, CPU, ROM and RAM, and is provided with a main controller 417 for controlling these component units.

Further, the controller 42 is composed of an input-output interface 421 connected to the input-output device 41, a display 422 that is composed of a liquid crystal display, etc., a control panel 423, a network interface 424 connected to the network 1, a hard disc drive (HDD) 425, CPU, ROM and RAM, and is provided with a main controller 426 for controlling these component units. The control panel 423 is provided with keys for making a request to the storage server 3 to take out electronic catalog data. The controller 42 makes a request to storage server 3 to take out electronic catalog data by operating these keys (the requesting means). Further, the terminal device 4 has own peculiar (e.g., particular) address information and when sending an electronic catalog request to the storage server 3, also sends this address information.

Next, the operation in the first embodiment of this invention in the structure as shown above will be explained. At an exhibition hall, contents servers are provided in booths of respective companies; for instance, the contents server 2a of A company in the booth, the contents server 2b of B company in the booth of B company, and so on.

A customer visited an exhibition hall has a mobile phone 5 with him. When he enters into a region within 10m from the contents servers 2a, 2b, . . . , the contents servers 2a, 2b, . . . and the mobile phone 5 become the data sending/receiving possible state through the wireless communication by the "BLUETOOTH™" function.

Figure 6:
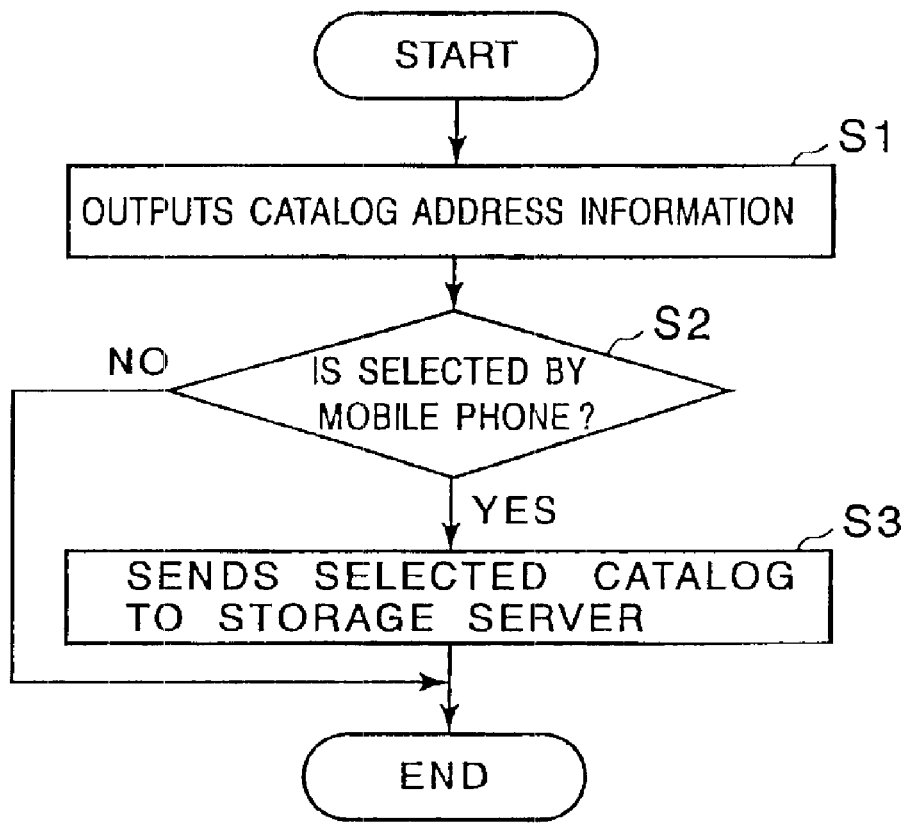
FIG. 6 is a flowchart showing the processes of the contents server of the electronic catalog system shown in FIG. 1.
Figure 7:
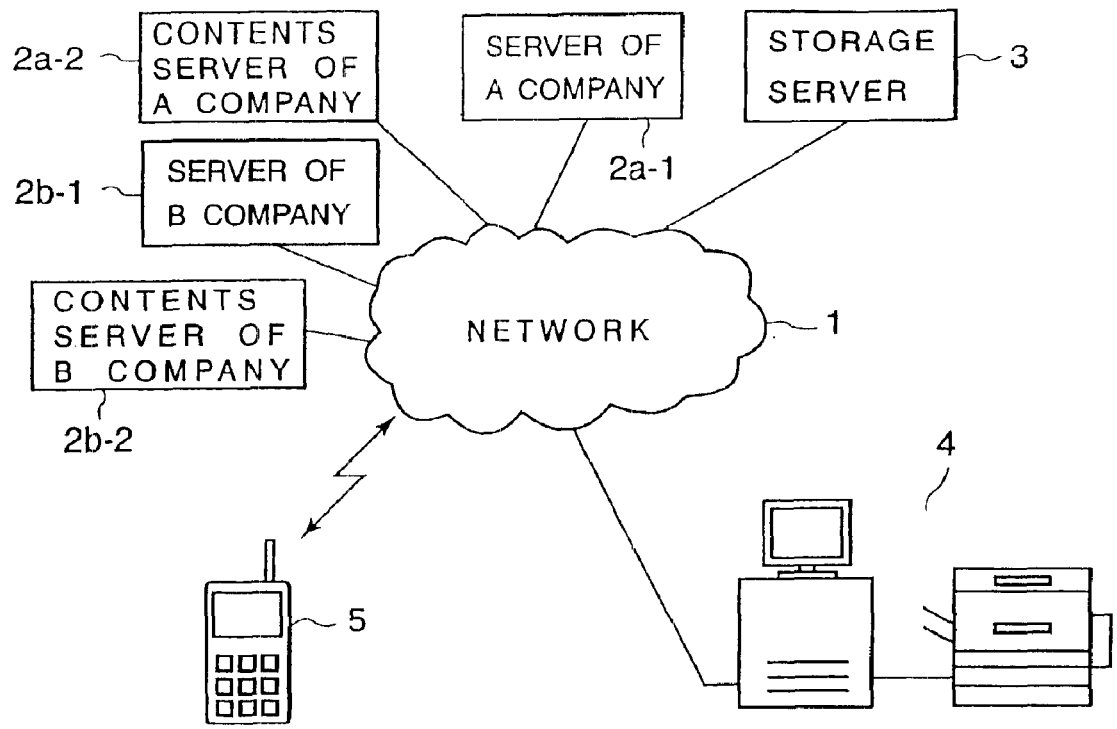
FIG. 7 is a block diagram showing the structure of the electronic catalog system in a second embodiment of this invention.
Figure 8:
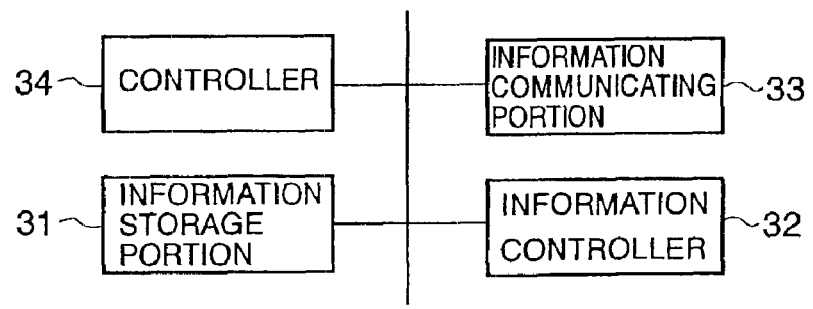
FIG. 8 is a block diagram showing the structure of the storage server of the electronic catalog system shown in FIG. 7.
Figure 9:
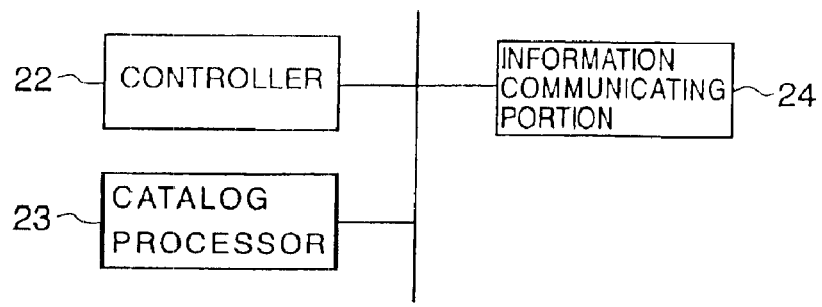
FIG. 9 is a block diagram showing the structure of a server of the electronic catalog system shown in FIG. 7.
Figure 10:
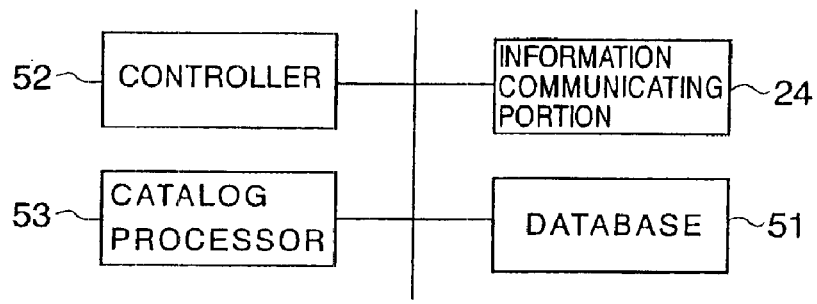
FIG. 10 is a block diagram showing the structure of the contents server of the electronic catalog system shown in FIG. 7.

When a customer visits the booth of A Company, a message "Welcome to Booth of A Company" is first sent from the contents servers 2a, 2b, . . . to the mobile phone 5. And address information for identifying electronic catalog data are sent to the mobile phone 5 from the contents servers 2a, 2b, . . . as shown in the flowchart in FIG. 6 (Step S1).

When receiving address information, the mobile phone 5 selects an address information adaptable to required electronic catalog data from the received address information. The selected address information is received via the information communication portion 24 of the contents server 2a. Then, the contents server 2a sends electronic catalog data adaptable to the selected address information from electronic catalog data stored in the database 21 to the storage server 3 via the network 1 (the data sending means) (Step S3). The sent electronic catalog data is stored in the information storage portion 31 of the storage server 3. The information storage portion 31 has a function like a post-office box of a post office. That is, the information controller 32 controls the write/read of data to/from the information storage portion 31. More precise, a user ID and password are needed for each user and electronic catalog data is written for each user ID. As this user ID, for instance, a mobile phone number is used.

When a visitor selects electronic catalog data by visiting the booths of A Company, B Company, . . . in order, the selected electronic catalog data are all stored in the information storage portion 31 of the storage server 3.

This visitor returns to the company and prints the catalog by the printer 413 of the terminal device 4. At this time, a user ID and a password are input through the control panel 415. The catalog data input through the control panel is sent to the storage server 3 via the network 1. This user ID and password are checked for correctness by the information controller 32 in the storage server 3. When the check results are correct, electronic catalog data desired to print are downloaded in the terminal device 4 and output from the printer 413.

That is, the storage server 3 has a program installed therein from a computer readable recording media to function as a means for sending electronic catalog data stored in the information storage portion 31 in response to an information take-out request from the terminal device 4.

Accordingly, a visitor to the exhibition hall is not required to bring heavy catalogs back to his company as it is possible to print the catalogs at the company.

In addition, as the terminal device 4 is also installed and available for use in a convenience store, it is possible to print out catalog data in a convenience store close to own home instead of the company.

Second Embodiment

A second embodiment of this invention will be explained referring to FIG. 7 through FIG. 13. In the first embodiment described above, the contents servers 2a, 2b, . . . stores electronic catalog data and address information adaptable to the electronic catalog data in the database 21. However, this system may be in such structure that the server 2a-1 of A company, the server 2b-1 of B company, . . . are installed in the booths of respective companies as first catalog servers so as to send address information of electronic catalog data according to the "BLUETOOTH™" function and actual electronic catalog data are stored in the contents server 2a-2 of A company and the contents server 2a-2 of B company which are catalog servers connected to the network 1 likewise the second embodiment.

In FIG. 7 through FIG. 11, the same reference numerals are assigned to the same component elements as those in the first embodiment described above and the detailed explanation thereof will be omitted.

The servers 2a-1, 2b-1, . . . have the controller 22, the catalog processor 23 for the electronic catalog processing, the information communicating portion 24 which communicates with the storage server 3, the contents servers 2a-2, 2b-2, . . . , respectively via the network 1 and equipped with an address sending/receiving means to send/receive address information for identifying catalog data within a range of 10m according to the "BLUETOOTH™" function.

Further, the contents servers 2a-2, 2b-2, . . . have a database 51 that is composed of a hard disc drive, etc., a controller 52, a catalog processor 53 for making the electronic catalog process, and the information communicating portion 24 for communicating with the servers 2a-1, 2-1, . . . and the storage server 3 via the network 1.

Figure 11:
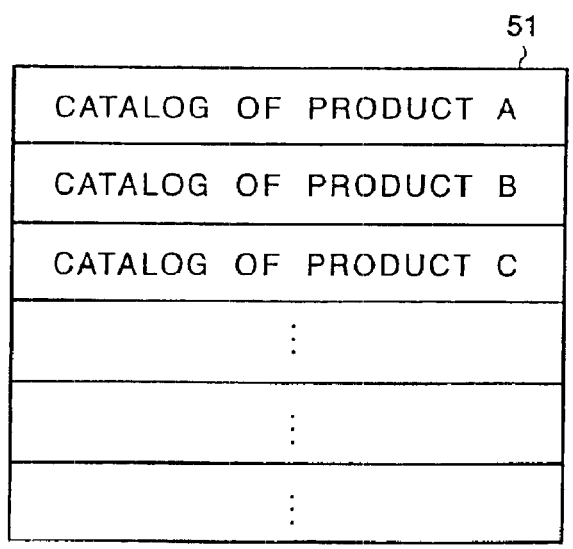
FIG. 11 is a map showing the stored contents of the database of the electronic catalog system shown in FIG. 7.
Figure 12:
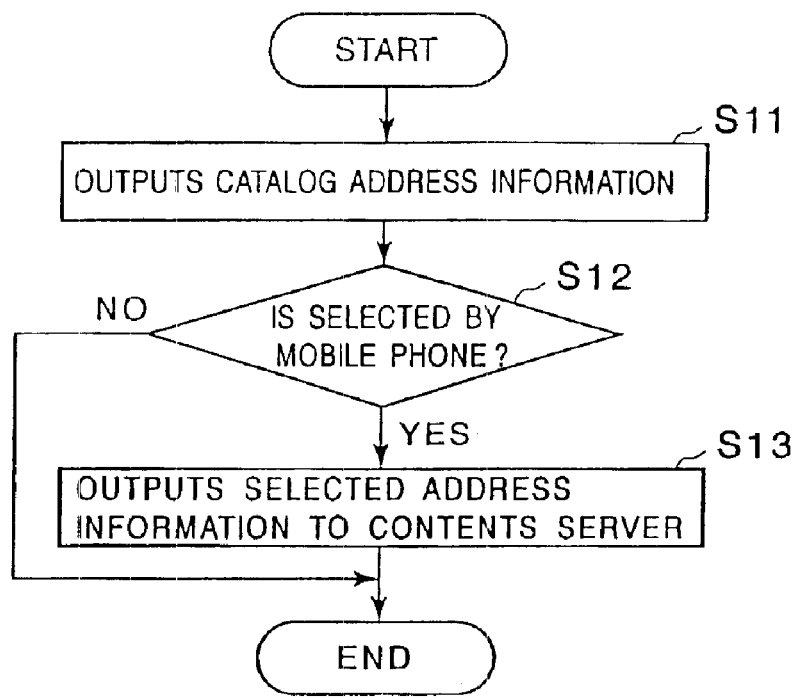
FIG. 12 is a flowchart for explaining the operations of the server of the electronic catalog system shown in FIG. 7.
Figure 13:
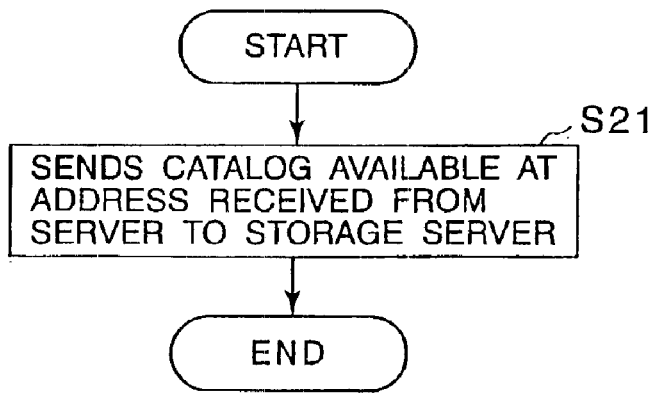
FIG. 13 is a flowchart for explaining the operation of the contents server of the electronic catalog system shown in FIG. 7.
Figure 14:
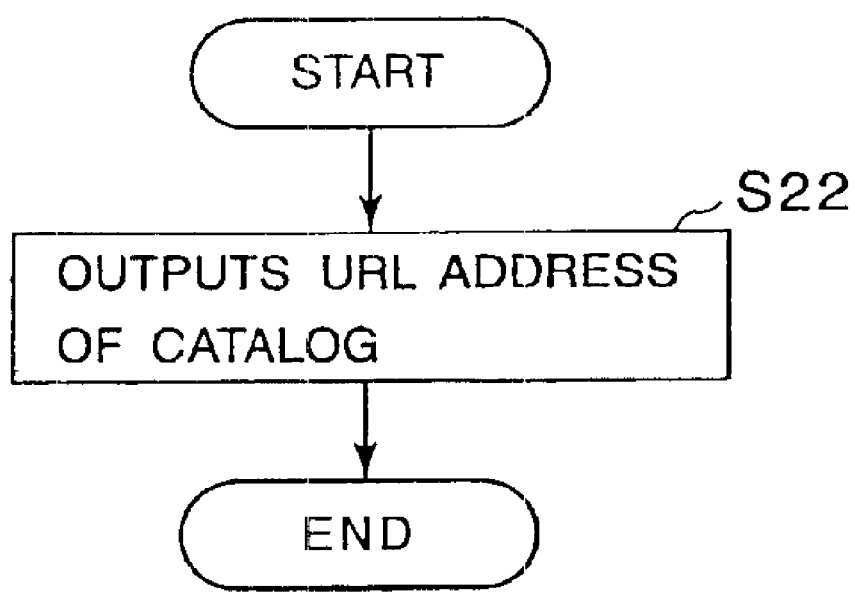
FIG. 14 is a flowchart for explaining the operation of the electronic catalog system in a third embodiment of this invention.

The database 51 stores catalog data of product a of A company, product b of B company, product c of C company, . . . as shown in FIG. 11.

Next, the operation of the second embodiment of this invention constructed as described above will be explained. At an exhibition hall, there are servers provided in booths of respective companies like the server 2a-1 of A Company in A Company's booth, the server 2a- 1 of B Company in B Company's booth, . . .

A customer visited the exhibition hall carries a mobile phone with him. When the customer enters in a range of 10 m from the servers 2a-1, 2b-1 of respective companies, the servers 2a, 2b and the mobile phone 5 become the state wherein it is possible to make the wireless communication by the "BLUETOOTH™" function.

First, when a visitor visits the exhibition starting from the A company's booth, a message "Welcome to Booth of A Company" is sent to the mobile phone 5. Then, an address information for identifying electronic catalog data is sent to the mobile phone 5 as shown in the flowchart in FIG. 12 (Step S11).

When receiving the address information, the mobile phone 5 selects an address information adaptable-to required electronic catalog data from the received address information. This selected address information is received via the information communication portion 24 of the server 2a-1. When there is an address information selected by the mobile phone 5, the server 2a-1 sends the selected address information to the contents server 2a-2 of A company (Step S13).

The address information sent from the server 2a-1 is received through the information communication portion 54 of the contents server 2a-2. The contents server 2a-2 sends electronic catalog data adaptable to the selected address information out of the electronic catalog data stored in the database 51 to the storage server 3 through the network (Step S21). This sent electronic catalog data is stored in the information storage portion 31 of the storage server 3. The information storage portion 31 functions like a post-office box of a post office. That is, the information controller 32 controls the write/read of data to/from the information storage portion 31. More precise, a user ID and a password are needed for each user and electronic catalog data is written for each user ID. For example, a mobile phone number is used as this user ID.

When a visitor came to an exhibition hall visits A Company booth, B Company booth, . . . in order and selects electronic catalog data, the selected electronic catalog data are all stored in the information storage portion 31 of the storage server 3.

Then, the visitor returns to own company from the exhibition hall and the selected electronic catalog is printed out from the printer 413 of the terminal device 4. At this time, a user ID and a password are input through the control panel 415. The data input through the control panel 415 is sent to the storage server 3 via the network 1. Then, the information controller 32 in the storage server 3 checks the input user ID and password. When the checked results are correct, electronic catalog data that are desirable to print out are downloaded in the terminal device 4 through the network 1 and output from the printer 413 (the sending means).

That is, the storage server 3 has a program installed therein from a computer readable recording media to function as a sending means for sending electronic catalog data stored in the information storage portion 31 to the terminal device 4 in response to an information take-out request made by it.

Accordingly, this system is very convenient because a visitor to an exhibition hall is able to print catalogs at a company without taking heavy catalogs back to the company.

Further, as a terminal device 4 is also available in a convenience store, catalogs can be printed out at a place near a home instead of a company.

Further, in the second embodiment described above, address information of electronic catalog data is sent from the servers 2a-1, 2b-1 according to "BLUETOOTH™" function. However, a URL address of a home page wherein catalog data of respective companies are provided may be sent to a mobile phone 5. In this case, a visitor stores a selected URL address in a mobile phone 5 carried with him and after returning to a company, accesses the contents servers 2a-2, 2b-2 of respective companies through the terminal device 4 or the mobile phone 5 and downloads electronic catalog data in the information storage portion 31 of the storage server 3. The subsequent process to print the electronic catalog data stored in the information storage portion 31 is the same as that in the first and second embodiments and therefore, it is omitted here.

Further, a recent sales period of products is short and if a catalog is printed in a large amount at one time, the catalogs may become excess when completing the sales, that is, when starting the sales of a next model, the catalogs will become unnecessary stock in some cases. In the first and second embodiments, catalogs are electronic data and can be printed whenever it becomes necessary to print them. So, it is possible to prevent catalogs from becoming unnecessary stocks.

Further, a mobile terminal is not limited to a mobile phone 5 but can be any mobile type terminal that has a browser function. In other words, a mobile phone (Web phone, browser phone, smart phone) and mobile equipment (Palm, PDA, sub-note PC) having equal function are usable.

As described above, according to this invention, substances of catalogs can be printed and output at a separate place other than an exhibition hall and therefore, this electronic catalog system is very convenient because a visitor to an exhibition hall is not required to bring heavy catalogs back to a company.

What is claimed is:

1. An electronic catalog system comprising:
   a catalog server;
   a storage server to communicate with the catalog server and a mobile terminal through a network; and
   a terminal device to communicate with the storage server through the network;
   wherein the catalog server includes:
   a database to store address information for identifying plural catalog data and each catalog data;
   wireless communicating means for making the wireless communication within a specified range around the catalog server; and
   data sending/receiving means for sending the address information of the catalog data to the mobile terminal through the wireless communicating means and sending the catalog data corresponding to the address information selected by the mobile terminal along with particular address information of the terminal device to the storage server;
   wherein the storage server includes:
   communication means; and
   storage means for storing various information including catalog data for each user ID of the mobile terminal;
   wherein the terminal device includes:
   means for requesting take-out of information to the storage server; and
   means for printing and outputting received information when the information is received from the storage server.

2. An electronic catalog system according to claim 1, wherein the particular address information of the terminal device, along with a user ID and a password that matches a user ID and a password sent to the catalog server by the mobile terminal, must be received by the storage server, in order for the storage server to output the corresponding catalog data to the terminal device.

3. An electronic catalog system comprising:
   a first catalog server;
   a second catalog server;
   a storage server to communicate with the first and second catalog servers and a mobile terminal through a network; and
   a terminal device to communicate with the storage server through the network;
   wherein the first catalog server includes;
   a database to store address information for identifying plural catalog data;
   wireless communicating means for making the wireless sensing/receiving of data within a specified range around the first catalog server; and
   address sending means for sending address information of the catalog data through the wireless communicating means and sending the address information selected by a mobile terminal to the second catalog server;
   wherein the second catalog server includes:
   a database to store address information for identifying plural catalog data and each catalog data; and
   data sending/receiving means for sending catalog data corresponding to address information with particular address information of the terminal device, wherein the address information is sent from the first catalog server, to the storage server;
   wherein the storage server includes:
   communicating means; and
   storage means for storing various information including catalog data for each user ID of the mobile terminal;
   wherein the terminal device includes:
   means for requesting the information take-out to the storage server; and
   printing/outputting means for printing/outputting information when the information is received from the storage server.

4. An electronic catalog system according to claim 3, wherein the particular address information of the terminal device, along with a user ID and a password that matches a user ID and a password sent to the catalog server by the mobile terminal, must be received by the storage server, in order for the storage server to output the corresponding catalog data to the terminal device.

5. An electronic catalog system comprising:
   a first catalog server;
   a second catalog server;
   a storage server to communicate with the first and second catalog servers and a mobile terminal through a network; and
   a terminal device to communicate with the storage server through a network;
   wherein the first catalog server includes:
   a database to store URL address information containing plural catalog data;
   wireless communicating means for making the wireless sending/receiving within a specified range around the first catalog server; and
   means for sending the URL address information of the catalog data to the mobile terminal by the wireless communicating means;
   wherein the storage server includes:
   communicating means; and
   storage means for storing various information including catalog data for each user ID of the mobile terminal;
   wherein the terminal device includes:
   requesting means for making the information take-out request to the storage server; and
   printing/outputting means for printing/outputting information when the information is received from storage server.

6. A server comprising:
   storage means for storing electronic catalog data; and
   sending means for sending catalog data stored in the storage means to a terminal device in response to an information take-out request from the terminal device, wherein the catalog data corresponds to address information with particular address information of the terminal device.

7. A server according to claim 6, wherein the take-out request output by the terminal device includes a user ID and a password that is matched against a user ID and a password stored with the catalog data in the storage means, and
   wherein the catalog data is only sent to the terminal device when a match occurs between the user IDs and the passwords and an address of the terminal device matches the particular address information stored with the catalog data in the storage means.

8. A catalog data printing method comprising:
   sending address information storing electronic catalog data to a mobile terminal through a wireless communication;

sending catalog data adaptable to address information selected by a mobile terminal to a storage server, wherein the catalog data corresponds to address information with particular address information of a terminal device that communicates with the storage server over a network; and printing and outputting catalog data stored in the storage server.

9. A catalog data printing method comprising:

sending URL address information storing catalog data to a mobile terminal through a wireless communication;

sending catalog data stored in URL address selected by the mobile terminal to a storage server, wherein the catalog data corresponds to address information with particular address information of a terminal device that communicates with the storage server over a network; and printing and outputting catalog data stored in the storage server.

10. A media storing a program readable by a computer that is used as a server, and a program comprising the steps of:

storing catalog data in a storing means; and sending catalog data stored in the storage means to a terminal device in response to an information take-out request made therefrom, wherein the catalog data corresponds to address information with particular address information of the terminal device.

11. A media according to claim 10, wherein the take-out request output by the terminal device includes a user ID and a password that is matched against a user ID and a password stored with the catalog data in the storing means, and wherein the catalog data is only sent to the terminal device when a match occurs between the user IDs and the passwords and an address of the terminal device matches the particular address information stored with the catalog data in the storing means.

* * * * *